United States Patent [19]

Schreiber et al.

[11] 3,963,667

[45] June 15, 1976

[54] STORAGE-STABLE MOULDING COMPOSITIONS FOR THE MANUFACTURE OF LIGHT-STABLE, TRACKING-RESISTANT PLASTICS

[75] Inventors: Bruno Schreiber, Basel; Hermann Diethelm, Aesch; Jurgen Habermeier, Pfeffingen; Ewald Forster, Allschwil, all of Switzerland

[73] Assignee: Ciba-Geigy Corporation, Ardsley, N.Y.

[22] Filed: Oct. 31, 1974

[21] Appl. No.: 519,489

[30] Foreign Application Priority Data

Nov. 6, 1973 Switzerland.................... 15599/73

[52] U.S. Cl............................. 260/37 EP; 260/2 N; 260/47 EN
[51] Int. Cl.².......................................... C08L 63/00
[58] Field of Search.......... 260/37 EP, 47 EN, 2 EP, 260/2 N, 2 EC

[56] References Cited

UNITED STATES PATENTS

| | | | |
|---|---|---|---|
| 3,778,439 | 12/1973 | Habermeier | 260/37 EP X |
| 3,793,248 | 2/1974 | Porret et al. | 260/47 EN X |

*Primary Examiner*—Lewis T. Jacobs
*Attorney, Agent, or Firm*—Vincent J. Cavalieri

[57] ABSTRACT

Storage-Stable moulding compositions which contain solid adducts, containing epoxide groups, of triglycidyl-bis-hydantoins or triglycidyl-bis-dihydrouracils and organic compounds possessing several active hydrogen atoms, solid adducts, containing amino groups, of cycloaliphatic, heterocyclic or aromatic polyamines as curing agents, and fillers. The moulding compositions are used for the manufacture of light-stable and tracking-resistant plastics.

24 Claims, No Drawings

STORAGE-STABLE MOULDING COMPOSITIONS FOR THE MANUFACTURE OF LIGHT-STABLE, TRACKING-RESISTANT PLASTICS

The invention relates to storage-stable moulding compositions which contain solid adducts, containing epoxide groups, of triglycidal-bis-hydantoins or triglycidyl-bis-dihydrouracils and organic compounds possessing several active hydrogen atoms, solid adducts, containing amino groups, of cycloaliphatic, heterocyclic or aromatic polyamines as curing agents, and fillers. The moulding compositions are used for the manufacture of light-stable and tracking-resistant plastics.

Moulding compositions of epoxide resins based on (4,4-dihydroxydiphenyl)-propane-2,2 or other bisphenols or polyphenols and containing amines, acid anhydrides or aromatic polyhydroxy compounds (for example novolac resins) as curing agents are distinguished by ease of processing and very good properties of the mouldings and have therefore found a broad field of use.

However, the light stability of the mouldings is poor. Furthermore, their arcing resistance and tracking resistance is inadequate for some components (for example insulators) in the electrical industry. This disadvantage is attributable to the fact that at the temperature prevailing under exposure to high currents, or in an arc, aromatic compounds are converted wholly or partially into electrically conducting graphite, causing the complete destruction of the material.

In general it is known to manufacture moulding compositions of liquid or fused epoxide resins, curing agents, fillers, release agents and other adjuvants by mixing all these raw materials in a suitable mixing apparatus for the purpose and partially pre-reacting them. This method of manufacture can only be used with resin/curing agent combinations which are still sufficiently stable in the liquid state at the mixing temperature that they do not cure permanently. However, if this method is applied to the manufacture of moulding compositions of a crystalline raw material which melts at a relatively high temperature, such as, for example, triglycidyl isocyanurate, products of low storage stability and variable processing properties are obtained, which, in addition, tend to sweating-out on the surface of the mouldings.

It has now been found that these disadvantages can largely be eliminated and cured mouldings of good light stability and tracking resistance are obtained if storage-stable moulding compositions according to the invention are used. These moulding compositions are characterised in that they contain a. adducts, containing epoxide groups, of triglycidyl compounds of the formula I

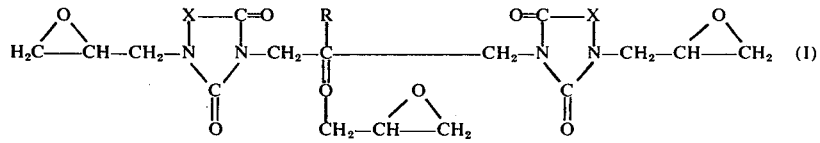

in which X denotes a divalent alkylene group required to form a 5-membered or 6-membered heterocyclic structure, and R denotes hydrogen or an alkyl group with 1 to 4 carbon atoms, and of organic compounds, possessing two or more active hydrogen atoms, as the resin, b. adducts, containing amino groups, of cycloaliphatic, aliphatic-cycloaliphatic, aromatic or heterocyclic polyamines and polyglycidyl compounds, as the curing agent and c. mineral or organic, pulverulent or fibrous fillers, and that the resin adducts and curing agent adducts soften at between 45° and 120°C and melt 5 to 30°C above the softening point.

The moulding compositions can contain other additives customary, or usable, in thermosetting resin moulding compositions, such as dyestuffs, agents for imparting flexibility and flame-retarding agents. They preferably contain lubricants.

Preferably the moulding compositions contain, as resin a), an adduct of a compound of the formula I and an aromatic primary monoamine, an aliphatic primary monoamine with 2 to 10 carbon atoms, a cycloaliphatic primary monoamine, a cycloaliphatic-aliphatic primary monoamine, a heterocyclic-aliphatic primary monoamine, a mononuclear or binuclear hydantoin or dihydrouracil, a dialcohol, a mononuclear or polynuclear dihydroxy compound or a dicarboxylic acid.

Preferred compounds of the formula I are triglycidyl compounds of the formula II:

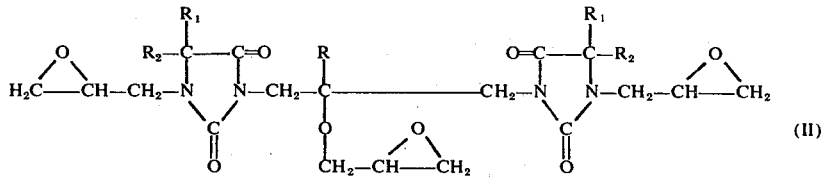

herein, R denotes hydrogen or an alkyl group with 1 to 4 carbon atoms and $R_1$ and $R_2$ denote hydrogen, or each denotes an alkyl group with 1 to 4 carbon atoms, or $R_1$ and $R_2$ together denote the tetramethylene or pentamethylene group.

The following are examples of classes of compounds with 2 or more active hydrogen atoms: amines, for example butylamine, aniline and especially cyclohexylamine, cyclic ureides, for example 1,1'-methylene-bis-(5,5-dimethyl-hydantoin) and 3,3'-(2-hydroxypropylene)-bis-(5,5-dimethyl-hydantoin), polyphenols, especially bisphenol A and bisphenol F, and polyalcohols, for example cyclohexene-1,1-dimethanol, hydrogenated bisphenol A or hydantoin-diols such as 1,1,-methylene-bis-(3-[2-hydroxy-ethyl]5,5-dimethyl-hydantoin), or dicarboxylic acids, such as phthalic acid, isophthalic acid, terephthalic acid or their alkyl homologues, or fully or partially hydrogenated derivatives, succinic acid and the like.

As the curing agent b), the moulding compositions according to the invention preferably contain an adduct of a cycloaliphatic or heterocyclic or aromatic diamine and a diglycidyl compound.

Possible cycloaliphatic diamines are, for example, 1,2-, 1,3- and 1,4-diaminocyclohexane, 4,4'-diaminodicyclohexylmethane, 4,4'-diaminodicyclohexylpropane-(2,2), 4,4'-diamino-3,3'-dimethyldicyclohexylmethane and other diaminodicyclohexylalkanes in addition to their homologues, and also 3-aminomethyl-3,5,5trimethylcyclohexylamine.

Examples of heterocyclic diamines are: N-aminoethylpiperazine, 2,3-dimethyl-3-aminopropylpiperidine and the like, whilst examples of aromatic polyamines are: m-phenylenediamine, 4,4'-diamino-diphenylmethane, 4,4'-diamino-3,3'-dichlorodiphenylmethane, 4,4'-diaminoditolyl-methane and the like.

Preferably, the diglycidyl component of the curing agent adduct b) is derived from a bisphenol A epoxide resin, the diglycidyl ester of a cycloaliphatic, heterocyclic or aromatic dicarboxylic acid, such as of 1,2-, 1,3- or 1,4-cyclohexanedicarboxylic acid, or N,N-cyclohexylamine-diglycid.

Particularly preferred moulding compositions are those which contain, as the curing agent b), an adduct of cycloaliphatic diamines, such as isophoronediamine or 4,4'-diamino-3,3'dimethyldicyclohexyl-methane, and a low-molecular bisphenol A epoxide resin with more than 5.0 epoxide group equivalents/kg or the diglycidyl ester of a cyclohexanedicarboxylic acid, such as hexahydrophthalic acid.

The moulding compositions according to the invention are manufactured as follows:

A triglycidyl compound of the formula I is reacted with an organic compound, containing two or more active hydrogen atoms, at between 50° and 200°C to give an adduct a) containing epoxide groups, which softens at between 45° and 120°C and melts 5° to 30°C above the softening point, in addition a cycloaliphatic, aliphatic-cycloaliphatic, aromatic or heterocyclic polyamine is reacted with a polyglycidyl compound at between 50° and 200°C to give an adduct b), containing amino groups, which softens at between 45° and 120°C and melts 5° to 30°C above the softening point, and the two adducts a) and b) are mixed with mineral or organic pulverulent or fibrous fillers, and the mixture is comminuted. Usually, a lubricant, dyestuffs or other adjuvants are also added to the mixture. The adduct a) is preferably manufactured at temperatures between 80° and 160°C and the adduct b) preferably between 120° and 170°C.

In manufacturing a), the preferred procedure followed is, as a rule, that 1 equivalent of the triglycidyl compound is used per equivalent of active hydrogen; however, upward and downward deviation from this molar ratio is possible. Depending on the nature of the reactant, the addition reaction may require catalysts. For this purpose it is possible to use the customary "epoxide catalysts," such as inorganic bases (sodium hydroxide solution, potassium hydroxide and the like), amines and ammonium compounds (for example tetraethylammonium chloride), or inorganic salts (for example lithium chloride).

The resin adduct a) can be manufactured in solution, but preferably in the melt, as is described in detail in Belgian Pat. Specification No. 782,032. The curing agent adduct b) is preferably manufactured in the presence of solvents by first taking the amino compound and mixing the diglycidyl compound into it, in portions or continuously, or mixing, and reacting, the two components continuously in a reactor suitable for the purpose, which is heated to temperatures up to 200°C; under these conditions the reaction takes place almost quantitatively and gives products of good storage stability.

The reaction approximately corresponds to the following equation:

$$2\ H_2N-Y-NH_2 + (CH_2-\overset{O}{\overset{\diagdown\!\diagup}{CH-CH_2}})_2\ Z \rightarrow$$

$$\rightarrow H_2N-Y-NH-CH_2-\underset{OH}{\overset{|}{CH}}-CH_2-Z-CH_2-\underset{OH}{\overset{|}{CH}}-CH_2-NH-Y-NH_2$$

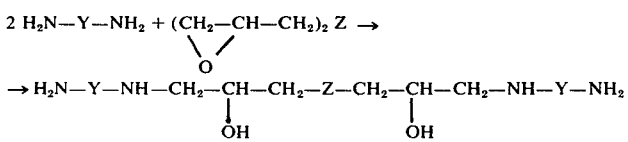

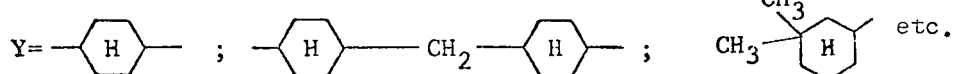

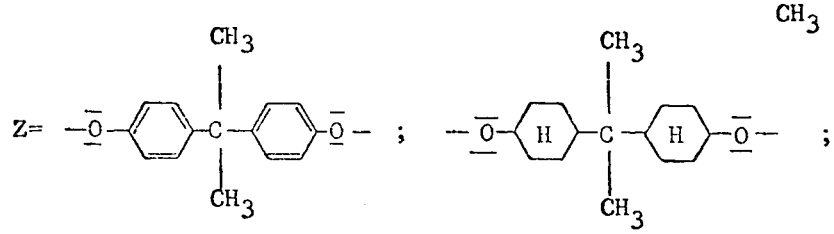

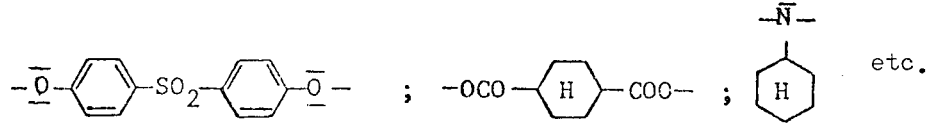

The ratio of amino groups to epoxide groups in the charge is as a rule in the range from 1.5 to 3.0, preferably from 1.75 to 2.50.

In a preferred embodiment of the process triglycidyl compounds of the formula II are used as starting materials and reacted with compounds containing active hydrogen atoms. Preferably, cycloaliphatic primary monoamines, such as cyclohexylamine, hydantoindiols, such as 1,1'-methylene-bis-[3-(2-hydroxy-ethyl)-5,5-dimethyl-hydantoin], or bisphenol A, or a dicarboxylic acid, such as terephthalic acid, isophthalic acid or hexahydrophthalic acid, are used as such compounds.

For the manufacture of the adduct b), cycloaliphatic or heterocyclic diamines are preferably reacted with diglycidyl compounds. As the latter, it is in particular possible to use bisphenol A epoxide resins, diglycidyl esters of cycloaliphatic, heterocyclic or aromatic dicarboxylic acids or N,N-cyclohexylamine-diglycid. In a particularly preferred embodiment of the manufacturing process, 4,4'-diamino-3,3'-dimethyldicyclohexylmethane or isophoronediamine is reacted with a bisphenol A epoxide resin with more than 5.0 epoxide group equivalents per kg or with the diglycidyl ester of a cyclohexanedicarboxylic acid, such as hexahydrophthalic acid, to give the adduct b).

Particularly preferred embodiments of the manufacturing process are those in which the preferred methods of manufacture of the adducts a) and b) are combined.

Preferably, approximately equivalent amounts of the adducts a) and b) are mixed, and comminuted, with inorganic, organic, pulverulent or fibrous fillers, for example also with pigments, and lubricants, in a ball mill or equipment which operates similarly and which permits comminution and mixing of the moulding composition without at the same time resulting in complete fusing together of the resin particles and curing agent particles. Thus, the resin and curing agent are, in part, present as separate particles in the finished moulding composition; they only react on fusion in the compression mould or screw injection moulding machine used to process them. The resulting powder is finally granulated and converted further.

It is also possible to manufacture the moulding compositions with an excess or less than equivalent amount of curing agent adduct b) and thereby to vary the properties of the moulding compositions within a certain range. Furthermore, the moulding compositions can be manufactured from several different resin adducts, or can contain other epoxide resins, polyester resins, polyurethane resins, silicone resins and other synthetic resins, all these resins being solid at room temperature, as well as various curing agent adducts, these either being admixed only in the mixing equipment, or being dissolved in the resin adducts or curing agent adducts. This enables the products to be modified, for example plasticised.

Fillers which can be used are kaolin, quartz powder, slate powder, chamotted kaolin, mica, wollastonite, diopside, dolomite, talc, barium sulphate, hydrated aluminum oxide, asbestos, antimony trioxide, wood flour and the like, and also pigments and substances which at the same time increase the strength or the stiffness, such as glass fibres, boron fibres and carbon fibres, fibres of cellulose, polyamide, polyesters and polyacrylonitrile and other inorganic or organic fibres. All combinations of such fillers can also be employed.

The release agents or lubricants used are stearates, such as zinc stearate, calcium stearate, magnesium stearate, aluminium stearate or zinc stearate, paraffin, stearin wax, beeswax, carnauba wax, montan wax and synthetic waxes based on polyethylene or silicones, and the like.

The moulding compositions are moulded, and cured, like other thermosetting resin moulding compositions by the compression, transfer or injection moulding process in moulds at 120° to 240°C. It is advantageous first to tablet and prewarm the moulding composition; however they can also be used as granules or in the form of a powder. The DIN bars used for the determination of the mechanical properties were moulded for 8 minutes at 165°C and under a pressure of 300 kp/cm$^2$.

All products cured in this way are distinguished by very high tracking resistance and arc resistance.

The moulding compositions containing little or no aromatic constituents are distinguished by particularly good light stability and can therefore be manufactured in very diverse colours, in particular also in pastel colours. The tests carried out show that the cured moulding compositions, when exposed in the open or in the Weather-o-meter are superior to moulding compositions of bisphenol A epoxide resin or epoxidised novolacs. Furthermore, they are distinguished by excellent dimensional stability and by generally very good mechanical and electrical properties. Their greatest advantage over the customary polyester and diallyl phthalate moulding compositions is their very good strength which is attributable to the advantageous properties of the resin/curing agent system. Thus, curing of moulding compositions according to the invention, filled only with mineral pulverulent fillers, gives products with flexural strength values and impact strength values which in the case of polyester moulding compositions and diallyl phthalate moulding compositions are only attainable if fibrous fillers are added.

The good processing properties of the amine-cured hydantoin moulding compositions in comparison to epoxide moulding compositions based on bisphenol A epoxide resins and triglycidyl isocyanurate epoxide resins, and cured with the same curing agent and filled with the same filler, are conspicuous. Surprisingly, the hydantoin moulding compositions do not have even the slightest tendency to stick to, and become misshapen in, the moulds, and furthermore have the best storage stability at room temperature.

There are also certain differences between the individual resins obtained from different hydantoin homologues. In this context, the lower water absorption and greater stiffness of the moulding compositions based on pentamethylenehydantoin compared to the dimethyl homologues should be mentioned, though the latter are in turn characterised by better impact strength.

The stated combination of the properties of hydantoin epoxide moulding compositions according to the invention makes these products very suitable for the manufacture of mouldings, such as insulators, switches, arc chambers and the like which make high demands in respect of tracking resistance and arc resistance, and furthermore all these mouldings can be produced in any desired colours, and are light-stable. Manufacture of the starting materials Manufacture of the adducts a), containing epoxide groups:

Resin adduct A: 1:2 adduct of cyclohexylamine and 3,3'-(2glycidyloxy-propylene)-bis-(1-glycidyl-5,5-dimethylhydantoin 2,883 g (6.0 mols) of the triglycidyl compound, described in Example 1 of Belgian Pat. Specification No. 782,032, of the formula III

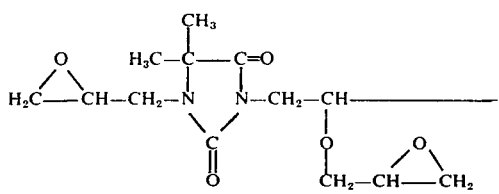 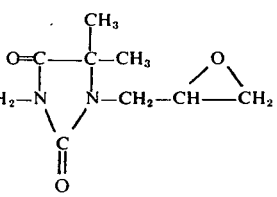

(III)

which contains 6.24 epoxide equivalents/kg, are heated to 90°C in a 4.5 liters laboratory stirring apparatus made of glass. 298.0 g (3.0 mols) of pure cyclohexylamine are added dropwise thereto over the course of 60 minutes, whilst stirring and flushing gently with nitrogen. During the addition, an exothermic reaction occurs so that the heating bath can be removed. At the same time the temperature rises to 112°C. After the dropwise addition, the exothermic effect subsides and the reaction mixture is heated to 150°C (bath temperature 158° – 162°C). The mixture is allowed to react for some hours longer, whilst stirring. In the course thereof, the descrease in the epoxide content and the rise in the softening point (determined by the Kofler method) are followed. Towards the end of the reaction, when practially all the protons of the amino groups have reacted, the epoxide content only continues to decrease very slowly; it then remains approximately constant. 3½ hours after completion of the dropwise addition, the epoxide content is still 4.73 equivalents/kg and the softening point is below 50°C. 2 hours later (after a total of 5½ hours following the dropwise addition) the softening point is 64°C and the epoxide content is 4.56 equivalents/kg. After a further hour (6½ hours after starting the dropwise addition, total reaction time 7½ hours), the heating bath is removed and the liquid contents of the flask, which are at 150°C, are poured into flat containers ("tins") of stainless steel to cool; the thickness of the layer of adduct is about 2 cm.

The adduct is allowed to cool by standing in air (approx. 30 – 60 minutes) and is then comminuted by striking the outside of the metal container. The brittle adduct hereupon cracks into sharp-edged clear, transparent, light yellow pieces; it is obtained in quantitative yield. After the comminuted adduct has cooled to room temperature, the softening point and the epoxide group content are again determined:

| | |
|---|---|
| Softening point (Kofler method) | 65°C |
| Melting point | 77°C |
| Epoxide content (pyridine hydrochloride) | 3.48 equivalents/kg (theory 3.77 equivalents/kg) |

Resin adduct B: 1:2 adduct of
1.1-dihydroxymethyl-cyclohex-3-ene and
3,3'-(2-glycidyloxy-propylene)-bis-(1-glycidyl
5,5-dimethylhydantoin)

1,250 g (2.6 mols) of the triglycidyl compound of the formula III (compare under A) are stirred at 120°C as in A; 185.0 g (1.3 mols) of 1,1-dihydroxymethyl-cyclohex-3-ene are added thereto, in one portion. 3.5 g of tetramethylammonium chloride are added and the mixture is stirred for 7 hours at 160°C; thereafter, the epoxide content is 4.48 equivalents/kg (initial value 5.43, theoretical final value 3.62 equivalents/kg). A further 1 g of tetramethylammonium chloride is added and the mixture is again stirred at 160°C, for 4 hours. Thereafter, the epoxide content is 3.71 equivalents/kg.

After a further 4 hours, the hot reaction mixture is poured out into an aluminum tin in order to cool. After cooling to room temperature, the clear, light brown, brittle resin can be comminuted.

| | |
|---|---|
| Softening point (Kofler method) | 57°C |
| Melting point | 67°C |
| Epoxide content | 2.90 equivalents/kg (79.9% of theory) |

Resin adduct C: 1:2 adduct of
1,1'-methylene-bis-[3-(2-hydroxyethyl)-5,5-dimethyl-hydantoin] and
3,3'-(2-glycidyloxy-propylene)-bis-(1-glycidyl-5,5-dimethyl-hydantoin)

961.0 g (2mols) of the triglycidyl compound of the formula III (compare under A) are stirred at 120°C as described under A. 356.4 g (1 mol) of 1,1'-methylene-bis-3-(2-hydroxyethyl)-5,5-dimethyl-hydantoin) (compare Helv. Chim. Acta 55 (2), 686–696 (1972)) are added thereto, in one portion. The temperature is then raised to 150°C. The diol introduced dissolves in the melt over the course of about 1 hour. Thereafter, 2.5 g of tetramethylammonium chloride are added and the temperature is raised to 160°C. After a further 3 hours, the epoxide content is 3.78 equivalents/kg (initial value 4.55; theoretical final value 3.03 equivalents/kg). 5 hours later, the softening point is 58°C and the epoxide content 3.23 equivalents/kg. After stirring for a further 2½ hours at 160°C, the softening point is 62°C and the epoxide content 3.06 equivalents/kg. The reaction is then terminated by cooling on tins as described under A. The clear brittle light brown adduct obtained in quantitative yield has the following properties:

| | |
|---|---|
| Softening point (Kofler method) | 63°C |
| Melting point | 74°C |
| Epoxide content | 3.02 equivalents/kg (99.7% of theory) |

Resin adduct D: 1:2 adduct of bisphenol A and
3,3'-(2-glycidyloxy-propyl)-bis-(1-glycidyl-5,5-dimethyl-hydantoin)

4,481 g (9 mols) of the triglycidylhydantoin derivative of the formula III (compare under A) are heated to 120°C in a 6 liter stirring apparatus. 1,027.4 g of bisphenol A are added in portions over the course of 10 minutes, whilst stirring. The mixture is then stirred for 2 hours at 145° – 150°C. A sample withdrawn from the charge the softens at 65°C and contains 3.37 epoxide equivalents/kg.

After a further 10 minutes reaction time, the reaction is terminated, and the product worked up, as described under A.

A clear, light yellow, brittle resin is obtained in quantitative yield; it softens at 68°C, metls at 81°C and has an epoxide content of 3.32 equivalents/kg (99.7 percent of theory).

Resin adduct E: 1:3 adduct of
3,3'-(2-hydroxy-propylene)-bis-(5,5-dimethyl-hydantoin) and
3,3'-(2-glycidyloxy-propylene)-bis-(1-glycidyl-5,5-dimethyl-hydantoin)

1,748 (3.6 mols) of the triglycidyl compound of the formula III (compare under A) are stirred at 120°C, as described under A. 6 g of tetramethylammonium chloride are then added and 375 g (1.2 mols) of 3,3'-(2-hydroxy-propylene)-bis-(5,5-dimethyl-hydantoin) (described in Belgian Pat. Specification No. 782,032) are then stirred in. The temperature is then raised to 130° – 140°C. After 1 hour, a sample withdrawn from the charge has a softening point of 50°C. 2 hours later, the softening point is 60°C. The procedure described under A is then followed for working up, and a light yellow, brittle resin is obtained in quantitative yield; it softens at 60°C, melts at 70°C and has an epoxide content of 3.82 equivalents/kg.

Resin adduct F: 1:2 adduct of
1,1'-methylene-bis-(5,5-dimethyl-hydantoin) and
3,3'-(2-glycidyloxy-propylene)-bis-(1-glycidyl-5,5-dimethyl-hydantoin)

96.1 g (0.2 mol) of the triglycidyl compound of the formula III (compare under A) are stirred at 120°C. 26.8 g (0.1 mol) of 1,1'-methylene-bis-(5,5-dimethyl-hydantoin) are added in portions, 0.1 g of tetramethylammonium chloride is then added and the mixture is stirred for 2 hours at 150°C. It is the worked up as described under A and a yellow, brittle, clear resin is obtained in quantitative yield; it softens at 74°C (Kofler method), melts at 87°C and has an epoxide content of 3.42 equivalents/kg (theory: 3.3 equivalents/kg).

Resin adduct G: 1:2 adduct of cyclohexylamine and
3,3'-(glycidyl-propylene)-bis-(1-glycidyl-5,5-pentamethylene-hydantoin)

An adduct of 451.5 g (0.8 mol) of 3,3'-(glycidyloxy-propylene)-bis-(1-glycidyl-5,5-pentamethylene-hydantoin (described in Belgian Pat. Specification No. 782,032) and 39.8 g (0.4 mol) of cyclohexylamine is prepared analogously to the description under A.

The reaction, its control, and the working up process are carried out exactly as described under A, and a clear, yellow, brittle resin with 3.11 epoxide equivalents/kg (theory 3.27), a softening point of 77°C by the Kofler method and a melting point of 90°C is obtained.

Resin adduct H: 1:2 adduct of hydrogenated bisphenol A and
3,3'-glycidyloxy-propylene)-bis-(1-glycidyl-5,5-dimethyl-hydantoin)

Following the procedure described under A, 1,410 g (2.936 mols) of the triglycidyl compound of the formula III (compare under A) are reacted with 353 g (1.468 mols) of hydrogenated bisphenol A under the catalytic action of 2 mol percent of tetraethylammonium chloride. After working up as described under A, about 1,760 g of a clear, yellow, brittle resin are obtained; it softens at 63°C (Kofler method), melts at 74°C and has an epoxide content of 2.78 equivalents/kg.

Resin adduct J: adduct of terephthalic acid and
1,3-di-(1-glycidyl-5,5-pentamethylene-hydantoin-3-yl)-glycidyloxy-propane 624.5 g of 1,3-di-(1-glycidyl-5,5-pentamethylene-hydantoin-3-yl)-glycidyloxy-propane of epoxide content 5.30 equivalents/kg (1.114 mols) are stirred at 125° – 130°C under nitrogen in a glass apparatus of 750 ml of capacity. 0.225 g of tetramethylammonium chloride is then added, and 83.4 g of terephthalic acid (0.501 mol) are added to the clear melt over the course of 30 minutes. The temperature is raised to 150°C over the course of 60 minutes. After 2 hours the heating bath is removed and the light brown clear reaction product is poured out onto tins to cool. After cooling, the product is comminuted. A material which can be grond easily, softens at 74°C (Kofler method), melts at 90°C and has an epoxide content of 3.13 equivalents/kg is obtained.

Manufacture of the adducts b) containing amino groups:

Curing agent I 477 g of 4,4'-diamino-3,3'-dimethyldicyclohexylmethane (8.4 amino equivalents/kg) are initially introduced into a 1 liter reaction vessel and warmed to 130°C. 284 g of the diglycidyl ester of 1,2-cyclohexanedicarboxylic acid are mixed in over the course of 30 minutes and the whole is warmed for a further 30 minutes. The product is then cooled and ground.

| Properties of the product: | |
|---|---|
| Amino group equivalents/kg | 5.94 |
| Softening point, Kofler method | 60°C |
| Melting point, Kofler method | 73°C |

Curing agent II 420.7 g of 4,4'-diamino-dicyclohexylmethane (9.5 amino equivalents/kg) are mixed with 374.5 g of bisphenol A epoxide resin (5.3 epoxide equivalents/kg) in a 1 liter reaction vessel and warmed to 130°C over the course of 1 hour. After additionally warming for 1 hour, the viscous product is cooled and pulverised.

| Properties of the product: | |
|---|---|
| Amino group equivalents/kg | 3.71 |
| Softening point, Kofler method | 66°C |
| Melting point, Kofler method | 78°C |

Curing agent III 545 g of 4,4'-diamino-3,3'-dimethyl-dicyclohexylmethane are initially introduced into a 2 liter reaction vessel and warmed to 130°C. 450 g of bisphenol A epoxide resin are added dropwise, and mixed in, over the course of 40 minutes, and the mixture is then warmed for a further 20 minutes at the same temperature. The product is then cooled and ground.

| Properties of the product: | |
|---|---|
| Amino group equivalents/kg | 4.17 |
| Softening point, Kofler method | 65°C |
| Melting point, Kofler method | 78°C |

Curing agent IV 1,142 g of 1,2-diaminocyclohexane (17.4 amino equivalents/kg) are premixed with 1,170 g of N,N-cyclohexylaminodiglycid (8.7 epoxide equivalents/kg) at room temperature, the mixture is fed into a co-kneader warmed to 150°C and the solid product obtained after cooling is pulverised.

| Properties of the product: | |
|---|---|
| Amino group equivalents/kg | 6.50 |
| Softening point, Kofler method | 65°C |
| Melting point, Kofler method | 79°C |

Curing agent V 920 g of 4,4'-diamino-3,3'-dimethylcyclohexylmethane are initially introduced into a 2 liter reaction vessel and warmed to 130°C. 300 g of triglycidyl isocyanurate (9.3 epoxide equivalents/kg) in the molten form (120°C) are then added dropwise and mixed in, over the course of 45 minutes. The product obtained after cooling is pulverised.

| Properties of the product: | |
|---|---|
| Amino group equivalents/kg | 8.9 |
| Softening point, Kofler method | 55°C |
| Melting point, Kofler method | 70°C |

Curing agent VI 340.6 g (2 mols) of 3-aminomethyl-3,5,5-trimethylcyclohexylamine (= isophoronediamine) are warmed to 120°C in a 1 liter reaction vessel and 377.3 g of bisphenol A epoxide resin (5.3 epoxide equivalents/kg) are added dropwise, and mixed in, over the course of 30 minutes, with constant stirring. The resulting product, which is solid after cooling, is pulverised.

| Properties of the product: | |
|---|---|
| Amino group equivalents/kg | 4.18 |
| Softening point, Kofler method | 63°C |
| Melting point, Kofler method | 78°C |

Curing agent VII 228.4 g of 1,2-diamino-cyclohexane are intitially introduced into a 1 liter reaction vessel and 375 g of bisphenol A epoxide resin (5.34 epoxide group equivalents/kg) are added dropwise, and mixed in, over the course of 30 minutes, at 130°C. After additional warming for a further 30 minutes, the product is cooled and pulverised.

| Properties of the product: | |
|---|---|
| Amino group equivalents/kg | 4.97 |
| Softening point, Kofler method | 62°C |
| Melting point, Kofler method | 78°C |

Curing agent VIII 258.4 g of N-aminoethylpiperazine are warmed to 120°C in a 1 liter reaction vessel. 395 g of bisphenol A epoxide resin (epoxide equivalents/kg = 5.30) are added dropwise, and mixed in, over the course of 45 minutes, with constant stirring. The solid product obtained after 30 minutes' additional warming to 130°C, and subsequent cooling, is ground.

| Properties of the product: | |
|---|---|
| Amino group equivalents/kg | 4.4 |
| Softening point, Kofler method | 51°C |
| Melting point, Kofler method | 62°C |

Curing agent IX 340 g of 2,3-dimethyl-3-aminopropyl-piperidine are warmed to 130°C in a 1 liter reaction vessel. 390 g of bisphenol A epoxide resin (5.35 epoxide equivalents/kg) are added dropwise, and mixed in, over the course of 45 minutes, with constant stirring. The solid product obtained after 30 minutes' additional warming to 130°C is ground.

| Properties of the product: | |
|---|---|
| Amino group equivalents/kg | 2.8 |
| Softening point, Kofler method | 55°C |
| Melting point, Kofler method | 68°C |

Curing agent X 1,200 g of 4,4'-diamino-diphenylmethane are weighed into a 3 liter reaction vessel, and warmed to 140°C. 1,000 g of a liquid bisphenol A epoxide resin (5.35 epoxide equivalents/kg) are added dropwise, and mixed in, over the course of 50 minutes, with constant stirring. After a further 30 minutes at the same temperature, the product is cooled and ground.

| Properties of the product: | |
|---|---|
| Amino group equivalents/kg | 4.2 |
| Softening point, Kofler method | 64°C |
| Melting point, Kofler method | 77°C |

Examples

Moulding composition 1

202 g of resin adduct A are ground for 2 hours with 98 g of curing agent III, 482 g of chamotted kaolin, 190 g of aluminum oxide trihydrate, 5 g of "OP Wachs" (partially esterified montan wax of Messrs. Hoechst), 20 g of colloidal silicon oxide and 3 g of brown iron oxide in a 5 liter ball mill. The resulting fine powder is granulated and tabletted. The tablets, warmed to 80°C, are moulded by the compression moulding process in a mould warmed to 160°C, under a pressure of 300 kp/cm$^2$. After a press of 8 minutes, the properties of the test specimens are measured. Compare Table 1.

Moulding composition 2

181 g of resin adduct G, 89 g of curing agent adduct III, 720 g of quartz powder, 5 g of gas black and 5 g of "OP Wachs" are weighed into a 5 liter ball mill and ground for 6 hours. The resulting pulverulent moulding composition is tabletted and the tablets, prewarmed to 70° – 80°C, are compression moulded as in Example 1. The values listed in Table 1 are measured.

Moulding composition 3

174 g of resin adduct J are ground for 10 hours with 86 g of curing agent adduct III, 730 g of wollastonite, 7 g of "OP Wachs" and 3 g of gas black in a 5 liter ball mill. The resulting powder is tabletted, prewarmed and moulded by the transfer moulding process in a mould heated to 170°C. The values listed in Table 1 are measured on the test specimens, which have been cured for 5 minutes.

Moulding composition 4

210 g of resin adduct C are ground for 7 hours with 70 g of curing agent adduct X, 700 g of chamotted kaolin, 2 g of "OP Wachs," 15 g of titanium dioxide and 3 g of gas black in a 5 liter ball mill. The resulting product is tabletted and prewarmed to 70°C, and the test specimens are cured for 10 minutes in a compression mould heated to 180°C.

For properties, see Table 1.

Moulding composition 5

214 g of resin adduct D are ground for 7 hours with 66 g of curing agent adduct IV, 600 g of quartz powder, 112 g of talc, 5 g of "OP Wachs" and 3 g of calcium stearate in a 5 liter ball mill. The resulting powder is tabletted, prewarmed to 80°C by high frequency heating and moulded as in Example 1.

For properties, see Table 1.

Moulding composition 6

192 g of resin adduct D are ground for 8 hours with 88 g of curing agent adduct VI, 520 g of chamotted kaolin, 190 g of aluminum oxide trihydrate, 5 g of "OP Wachs," 2 g of stearic acid and 3 g of gas black in a 5 liter ball mill. The product is moulded as in Example 1.

For properties, see Table 1.

Moulding composition 7

225 g of resin adduct F are ground for 10 hours with 75 g of curing agent adduct VII, 400 g of diopside, 250 g of barium sulphate, 40 g of titanium dioxide, 7 g of "OP Wachs" and 3 g of gas black in a 5 liter ball mill. The resulting finely pulverulent moulding composition is moulded as in Example 1.

For properties of the mouldings, see Table 1.

Moulding composition 8

180 g of resin adduct A are ground for 15 hours with g of "OP Wachs", 5 g of titanium dioxide and 10 g of chrome yellow in a 5 liter ball mill. The resulting moulding composition is moulded as in Example 1.

For properties, see Table 1.

Moulding composition 9

175 g of resin adduct A, 85 g of curing agent adduct III, 700 g of wollastonite, 30 g of titanium dioxide, 3 g of phthalocyanine blue and 7 g of "OP Wachs" are weighed into a 5 liter ball mill and ground for 15 hours. The resulting pulverulent moulding composition is tabletted and the tablets, prewarmed to 80°C, are moulded as in Example 1. The properties listed in Table 1 are measured.

Moulding composition 10

24.1 g of resin adduct B are ground for 12 hours with 5.9 g of curing agent adduct I, 300 g of ground glass fibres, 190 g of bolus alba, 200 g of wollastonite, 7 g of montan wax and 3 g of gas black in a 5 liter ball mill. The resulting product is tabletted, prewarmed and moulded by the transfer moulding process in a mould heated to 170°C. The values listed in Table 1 are measured on the test specimens, which have each been cured for 5 minutes.

Table 1

| Properties | Moulding compositions according to Examples |||||||||| 
|---|---|---|---|---|---|---|---|---|---|---|
| | 1 | 2 | 3 | 4 | 5 | 6 | 7 | 8 | 9 | 10 |
| Flexural strength (DIN), kp/cm² | 1,340 | 1,150 | 1,210 | 1,050 | 1,080 | 1,060 | 700 | 1,000 | 1,150 | 1,000 |
| Impact strength (DIN), cmkp/cm² | 13 | 10 | 9 | 12 | 8 | 7 | 7 | 9 | 10 | 9 |
| Martens heat distortion point (DIN), °C | 117 | 115 | 145 | 120 | 113 | 123 | 120 | 116 | 115 | 118 |
| Water absorption (DIN), mg | 13 | 8 | 10 | 18 | 10 | 18 | 14 | 13 | 14 | 13 |
| Inflammability (VDE) | 1 | 0 | 0 | 0 | 0 | 1 | 0 | 0 | 0 | 0 |
| Electrical volume resistance (DIN) Ohm . cm | 5.10¹⁵ | 1.10¹⁶ | 1.10¹⁶ | 4.10¹⁵ | 1.10¹⁶ | 1.10¹⁵ | 3.10¹⁵ | 4.10¹⁵ | 1.10¹⁵ | 4.10¹⁴ |
| Loss factor (VDE) tgδ/10³Hz | 0.015 | 0.006 | 0.01 | 0.008 | 0.007 | 0.013 | 0.012 | 0.010 | 0.01 | 0.02 |
| Tracking resistance (VDE) | KA 3c | KA 3c | KA 3c | KA 2 | KA 2 | KA 2 | KA 3c | KA 3c | KA 3c | KA 3c |

70 g of curing agent adduct I, 718 g of wollastonite, 7

What we claim is:

1. Storage-stable moulding composition, characterized in that it contains
    a. an adduct, containing epoxide groups, of a triglycidyl compound of the formula I

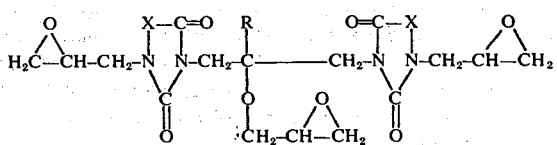

(I)

wherein X denotes a divalent alkylene group required to form a 5-membered or 6-membered heterocyclic structure and R denotes hydrogen or an alkyl group with 1 to 4 carbon atoms, and an organic compound possessing two or more active hydrogen atoms, selected from the group consisting of an aromatic primary monoamine, an aliphatic primary monoamine with 2 to 10 carbon atoms, a cycloaliphatic primary monoamine, a cycloaliphaticaliphatic primary monoamine, a heterocyclic-aliphatic primary monoamine, a mononuclear or binuclear hydantoin, a mononuclear or binulcear dihydrouracil, a dialcohol, a mononuclear or polynuclear phenol with 2 hydroxyl groups or a dicarboxylic acid, as the resin,
b. an adduct, containing amino groups, of a cycloaliphatic, aliphatic-cycloaliphatic, aromatic or heterocyclic polyamine and a polyglycidyl compound, as the curing agent, and
c. a mineral or organic, pulverulent or fibrous filler, and that the resin adduct and the curing agent adduct soften at between 45° and 120°C and melt 5° to 30°C above the softening point.

2. Moulding composition according to claim 1, characterised in that it also contains a lubricant.

3. Moulding composition according to claim 1, characterized in that it contains, as the resin (a), an adduct, containing epoxide groups, of a triglycidyl compound of the formula II

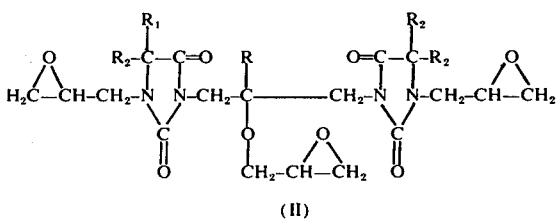

(II)

wherein R denotes hydrogen or an alkyl group with 1 to 4 carbon atoms and $R_1$ and $R_2$ denote hydrogen, or each denotes an alkyl group with 1 to 4 carbon atoms, or $R_1$ and $R_2$ together denote the tetramethylene or pentamethylene group, and of a compound containing two or more active hydrogen atoms, selected from the group consisting of an aromatic primary monoamine, an aliphatic primary monoamine with 2 to 10 carbon atoms, a cycloaliphatic primary monoamine, a cycloaliphatic-aliphatic primary monoamine, a heterocyclic-aliphatic primary monoamine, a mononuclear or binuclear hydantoin, a mononuclear or binuclear dihydrouracil, a dialcohol, a mononuclear or polynuclear phenol with 2 hydroxyl groups or a dicarboxylic acid.

4. Moulding composition according to claim 3, characterised in that it contains, as the resin (a), an adduct of a compound of the formula II and a cycloaliphatic primary monoamine, such as cyclohexylamine, a hydantoin-diol, such as 1,1'-methylene-bis-[3-(2-hydroxy-ethyl)-5,5-dimethyl-hydantoin], a bisphenol A or a dicarboxylic acid.

5. Moulding composition according to claim 1, characterised in that it contains, as the curing agent (b), an adduct of a cycloaliphatic, heterocyclic or aromatic diamine and a diglycidyl compound.

6. Moulding composition according to claim 5, characterised in that the diglycidyl component of the curing agent adduct (b) is derived from a bisphenol A epoxide resin.

7. Moulding composition according to claim 6, characterised in that it contains, as the curing agent (b), an adduct of 4,4-diamino-3,3'-dimethyldicyclohexylmethane or isophoronediamine and a bisphenol A epoxide resin with more than 5.0 epoxide group equivalents/kg or the diglycidyl ester of hexahydrophthalic acid.

8. Moulding composition according to claim 1, characterised in that it contains an adduct according to claim 4 as the resin (a) and an adduct according to claim 5 as the curing agent (b).

9. Moulding composition according to claim 1, characterised in that it contains as compound (a) a 1:2 adduct of cyclohexylamine and 3,3'-(2-glycidyloxy-propylene)-bis-(1-glycidyl-5,5-dimethylhydantoin and as compound (b) an adduct of 4,4'-diamino-3,3'-dimethyldicyclohexylmethane and a bisphenol A epoxide resin.

10. Moulding composition according to claim 1, characterised in that it contains as compound (a) a 1:2 adduct of cyclohexylamine and 3,3'-(2-glycidyloxy-propylene)-bis-(1-glycidyl-5,5-pentamethylene-hydantoin and as compound (b) an adduct of 4,4'-diamino-3,3'-dimethyl-dicyclohexylmethane and a bisphenol A epoxide resin.

11. Moulding composition according to claim 1, characterised in that it contains as compound (a) a 1:2 adduct of 1,1'-methylene-bis-[3-(hydroxyethyl)-5,5-dimethyl-hydantoin] and 3,3'-(2-glycidyloxy-propylene)-bis-(1-glycidyl-5,5-dimethyl-hydantoin and as compound (b) an adduct of 4,4'-diamino-diphenylmethane and a liquid bisphenol A epoxide resin.

12. Moulding composition according to claim 1, characterised in that it contains as compound (a) a 1:2 adduct of bisphenol A and 3,3'-(2-glycidyloxy-propyl)-bis-(1-glycidyl-5,5-dimethyl-hydantoin) and as compound (b) an adduct of 1,2-diaminocyclohexane and N,N-cyclohexylamine-diglycidol.

13. Moulding composition according to claim 1, characterised in that it contains as compound (a) a 1:2 adduct of 1,1'-methylene-bis-(5,5-dimethyl-hydantoin) and 3,3'-(2-glycidyloxy-propylene)-bis-(1-glycidyl-5,5-dimethyl-hydantoin) and as compound (b) an adduct of 1,2-diamino-cyclohexane and a bisphenol A epoxide resin.

14. Process for the manufacture of storage-stable moulding compositions, characterized in that a triglycidyl compound of the formula I

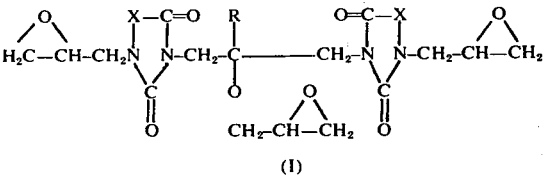

(I)

wherein X denotes a divalent alkylene group which is required to form a 5-membered or 6-membered heterocyclic structure, and R denotes hydrogen or an alkyl group with 1 to 4 carbon atoms, is reacted with an organic compound containing two or more active hydrogen atoms, selected from the group consisting of an aromatic primary monoamine, an aliphatic primary monoamine with 2 to 10 carbon atoms, a cycloaliphatic primary monoamine, a cycloaliphatic-aliphatic primary monoamine, a heterocyclicaliphatic primary monoamine, a mononuclear or binuclear hydantoin, a mononuclear or binuclear dihydrouracil, a dialcohol, a mononuclear or polynuclear phenol with 2 hydroxyl groups and 200°C to give an adduct (b), containing amino groups, which softens at between 45° and 120°C and melts at 5° to 30°C above the softening point and that the two adducts (a) and (b) are mixed, and comminuted, with mineral or organic pulverulent or fibrous fillers.

15. Process according to claim 14, characterised in that the two adducts (a) and (b) are mixed with fillers and a lubricant.

16. Process according to claim 14, characterised in that the manufacture of the adduct (a) is carried out at between 80° and 160°C.

17. Process according to claim 14, characterised in that the manufacture of the adduct (b) is carried out at between 120° and 170°C.

18. Process according to claim 14, characterised in that the adduct (a) is manufactured from the two components in the presence of a catalyst, such as bases or salts.

19. Process according to claim 14, characterised in that approximately 1 mol of the triglycidyl compound per equivalent of active hydrogen is used for the manufacture of the adduct (a).

20. Process according to claim 14, characterised in that a triglycidyl compound of the formula II or a dicarboxylic acid at between 50° and 200°C to give an adduct containing epoxide groups, which softens at between 45° and 120°C and melts at 5° to 30°C above the softening point, that a cycloaliphatic, aliphatic-cycloaliphatic, aromatic or heterocyclic polyamine is reacted with a polyglycidyl compound at between 50°

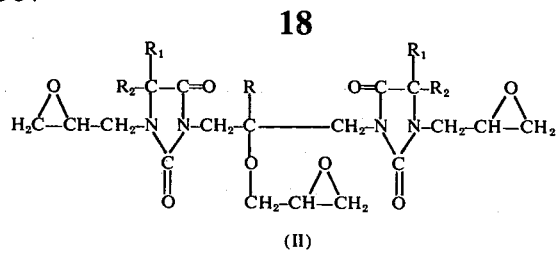

(II)

wherein R denotes hydrogen or an alkyl group with 1 to 4 carbon atoms and $R_1$ and $R_2$ denote hydrogen, or each denotes an alkyl group with 1 to 4 carbon atoms, or $R_1$ and $R_2$ together denote the tetramethylene or pentamethylene group, is used for the manufacture of the adduct (a).

21. Process according to claim 20, characterised in that a triglycidyl compound of the formula II and a cycloaliphatic primary monoamine, such as cyclohexylamine, a hydantoin-diol, such as 1,1'-methylene-bis-[3-(2-hydroxy-ethyl)-5,5-dimethyl-hydantoin], or a bisphenol A or a dicarboxylic acid, is used for the manufacture of the adduct (a).

22. Process according to claim 14, characterised in that a cycloaliphatic, heterocyclic or aromatic diamine and a diglycidyl compound are used for the manufacture of the adduct (b).

23. Process according to claim 22, characterised in that a bisphenol A epoxide resin is used as the diglycidyl compound for the manufacture of the adduct (b).

24. Process according to claim 23, characterised in that the starting materials for the manufacture of the adduct (b) are a 4,4'-diamino-3,3'-dimethyl-dicyclohexyl-methane and a bisphenol A epoxide resin with more than 5.0 epoxide group equivalents/kg, or the diglycidyl ester of hexahydrophthalic acid.

* * * * *